US008683476B2

(12) United States Patent
Saxe et al.

(10) Patent No.: US 8,683,476 B2
(45) Date of Patent: Mar. 25, 2014

(54) METHOD AND SYSTEM FOR EVENT-BASED MANAGEMENT OF HARDWARE RESOURCES USING A POWER STATE OF THE HARDWARE RESOURCES

(75) Inventors: Eric C. Saxe, Livermore, CA (US); Darrin P. Johnson, San Jose, CA (US); William D. Holler, Fremont, CA (US)

(73) Assignee: Oracle America, Inc., Redwood Shores, CA (US)

(*) Notice: Subject to any disclaimer, the term of this patent is extended or adjusted under 35 U.S.C. 154(b) by 664 days.

(21) Appl. No.: 12/495,079

(22) Filed: Jun. 30, 2009

(65) Prior Publication Data

US 2010/0332883 A1 Dec. 30, 2010

(51) Int. Cl.
*G06F 1/26* (2006.01)
*G06F 9/46* (2006.01)
*G06F 1/32* (2006.01)

(52) U.S. Cl.
USPC ........... 718/104; 718/102; 718/103; 713/300; 713/324

(58) Field of Classification Search
USPC ........... 718/100, 102, 103, 104; 713/300, 324
See application file for complete search history.

(56) References Cited

U.S. PATENT DOCUMENTS

| | | | |
|---|---|---|---|
| 5,826,081 A * | 10/1998 | Zolnowsky | 718/103 |
| 5,872,972 A * | 2/1999 | Boland et al. | 718/102 |
| 6,901,522 B2 * | 5/2005 | Buch | 713/320 |
| 7,036,030 B1 | 4/2006 | Altmejd | |
| 7,043,405 B2 * | 5/2006 | Orenstien et al. | 702/188 |
| 7,100,062 B2 * | 8/2006 | Nicholas | 713/324 |
| 7,448,037 B2 * | 11/2008 | Arimilli et al. | 718/104 |
| 7,934,111 B2 * | 4/2011 | Yamaji | 713/324 |
| 7,958,508 B2 * | 6/2011 | Shimizu et al. | 718/102 |
| 8,010,822 B2 * | 8/2011 | Marshall et al. | 713/324 |
| 2005/0210472 A1 * | 9/2005 | Accapadi et al. | 718/105 |
| 2006/0095913 A1 * | 5/2006 | Bodas et al. | 718/100 |
| 2007/0074219 A1 * | 3/2007 | Ginsberg | 718/102 |
| 2007/0124457 A1 * | 5/2007 | May et al. | 709/224 |
| 2008/0307238 A1 | 12/2008 | Bieswanger et al. | |
| 2009/0007120 A1 * | 1/2009 | Fenger et al. | 718/102 |
| 2009/0235260 A1 * | 9/2009 | Branover et al. | 718/102 |
| 2009/0307696 A1 * | 12/2009 | Vals et al. | 718/102 |

* cited by examiner

*Primary Examiner* — Abdullah Al Kawsar
*Assistant Examiner* — Abu Ghaffari
(74) *Attorney, Agent, or Firm* — Osha Liang LLP

(57) ABSTRACT

A system for dispatching a thread to a resource obtains a thread and utilization data for all resources. The system determines if there is a thread-resource affinity. The system uses thread-resource affinity to identify a resource and a timestamp for when the thread last completed executing on the resource. The system determines if the resource qualifies under a dispatch policy. The system uses utilization data to determine a timestamp for when the resource last transitioned to a not powered state. When the second timestamp precedes the first timestamp, the system dispatches the thread to the resource and generates a power management event. The system determines if the power management event satisfies a throttle policy. The system discards the power management event when throttle policy is unsatisfied and determines whether to adjust the current power state of the resource based on the power management event when throttle policy is satisfied.

11 Claims, 13 Drawing Sheets

METHOD AND SYSTEM FOR EVENT-BASED MANAGEMENT OF HARDWARE RESOURCES USING A POWER STATE OF THE HARDWARE RESOURCES

BACKGROUND

A modern computer system may be divided roughly into three conceptual elements: the hardware, the operating system, and the application programs. The hardware, (i.e., central processing unit (CPU), memory, persistent storage devices, and input/output (I/O) devices) provides the basic computing resources. The application programs (i.e., compilers, database systems, software, and business programs) define the ways in which these resources are used to solve the computing problems of the users. The users may include people, machines, and other computers that use the application programs, which in turn employ the hardware to solve numerous types of problems.

An operating system ("OS") is a program that acts as an intermediary between the application program layer and the computer hardware. As such, the operating system is configured to provide an environment in which a user can execute application programs in a convenient and efficient manner. Specifically, the operating system is tasked with managing hardware resources (i.e., CPU time, memory space, persistent storage space, I/O devices, etc.) by allocating them to specific programs and users as necessary. Because there may be many, possibly conflicting, requests for hardware resources, the operating system must decide which requests are allocated hardware resources to operate the computer system efficiently and fairly.

Different mechanisms are available to the operating system to facilitate hardware resource management. In processing a request from a process executing either within the operating system or within a user application program, execution threads are used to multi-task and therefore make efficient use of available hardware resources. Further, a group of common hardware resources may be shared by a group of active threads.

The dispatching of threads to hardware resources by the operating system, as described above, does have a power management impact on a computer system. For example, a hardware resource requires power for that hardware resource to be of any use to a thread that has been dispatched for execution on that hardware resource. As such, an idle hardware resource requires a power adjustment if and when a thread has been dispatched to the hardware resource for execution. Likewise, when the thread has completed executing on an active hardware resource, the hardware resource may require less power if no other threads have been subsequently dispatched to the hardware resource.

In view of this, power management for hardware resources is yet another mechanism aimed to promote efficiency in a computer system. For example, Energy Star ("E*") power requirements require system power consumption to be lowered to 15% of the normal operating power consumption level when the system is idle. Therefore, to conserve power, the operating system turns off (or lowers the operating frequencies of) idle hardware resources. In implementing a power management scheme, computer systems have typically polled its hardware resources for utilization data in periodic time increments, thereby allowing for a power management adjustment to take effect when instances of over-utilization or under-utilization are detected.

SUMMARY

In general, in one aspect, the invention relates to a method for dispatching a thread to a resource. The method includes obtaining a thread. The method further includes obtaining utilization data for a plurality of resources. The method further includes determining whether a resource affinity entry is stored for the thread. The method further includes identifying a resource using the resource affinity entry when the resource affinity entry is stored for the thread, where the resource is one of the plurality of resources. The resource affinity entry includes a thread identifier for the thread and a first timestamp associated with when the thread last completed executing on the resource. The method further includes determining whether the resource is qualified under a dispatch policy. The method further includes determining a second timestamp using utilization data when the resource is qualified under the dispatch policy, where the second timestamp is associated with when the resource last transitioned to a not powered state. The method further includes selecting the resource for dispatching the thread to and dispatching the thread to the resource when the second timestamp precedes the first timestamp.

In general, in one aspect, the invention relates to a method for managing a power state for a resource. The method includes receiving a power management event including a resource identifier corresponding to a resource at a power state, a processing state transition of the resource from idle to active, and a first timestamp corresponding to when the power management event was created. The method further includes obtaining a previous power management event for the resource, where the previous power management event includes the resource identifier, a second processing state transition, and a second timestamp corresponding to when the previous power management event was created. The method further includes determining whether the power management satisfies a throttle policy using at least one of a plurality of power management events, where the previous power management event is one of the plurality of power management events. The method further includes discarding the power management event when the throttle policy is not satisfied. The method further includes sending the power management event to a power manager when the throttle policy is satisfied, where the power manager determines whether to adjust the first current power state of the first resource based, in part, on the power management event.

In general, in one aspect, the invention relates to a system for managing a resource. The system includes a resource information store configured to store a resource entry for a first resource in a plurality of resources. The system further includes a resource affinity store configured to store a resource affinity entry for a thread, where the resource affinity entry includes a thread identifier corresponding to the thread, a resource identifier corresponding to the resource, and a first timestamp associated with when the thread last completed executing on the resource. The system further includes a utilization data store configured to store a resource utilization entry, where the resource utilization entry comprises a current power state and a second timestamp associated with when the resource transitioned to the current power state. The system further includes a dispatcher configured to obtain the thread. The dispatcher is further configured to obtain the resource utilization entry from the utilization data store. The dispatcher is further configured to determine whether the resource affinity entry is stored for the thread. The dispatcher is further configured to identify the resource using the resource affinity entry when the resource affinity entry is stored for the thread. The dispatcher is further configured to determine whether the resource is qualified under a dispatch policy. The dispatcher is further configured to determine the second timestamp using the resource utilization entry when the resource is qualified under the dispatch policy. The dispatcher is further configured to select the resource for dispatching the thread to and dispatch the thread to the resource when the second timestamp precedes the first timestamp.

Other aspects of the invention will be apparent from the following description and the appended claims.

BRIEF DESCRIPTION OF DRAWINGS

FIG. 3 shows a method for setting up a system to implement one or more embodiments of the invention, FIG. 4 shows a method for dispatching a thread to a hardware resource in accordance with one or more embodiments of the invention, FIG. 5 shows a method for filtering out power management events in accordance with one or more embodiments of the invention, FIG. 6 shows a method for transition a hardware resource from one power management state to another power management state.

FIG. 7 shows a graph with a timeline illustrating when various threads are received by each of the hardware resources and FIGS. 8a-8c show performance data illustrating the benefit of implementing one or more embodiments of the invention.

DETAILED DESCRIPTION

Figure 1A:
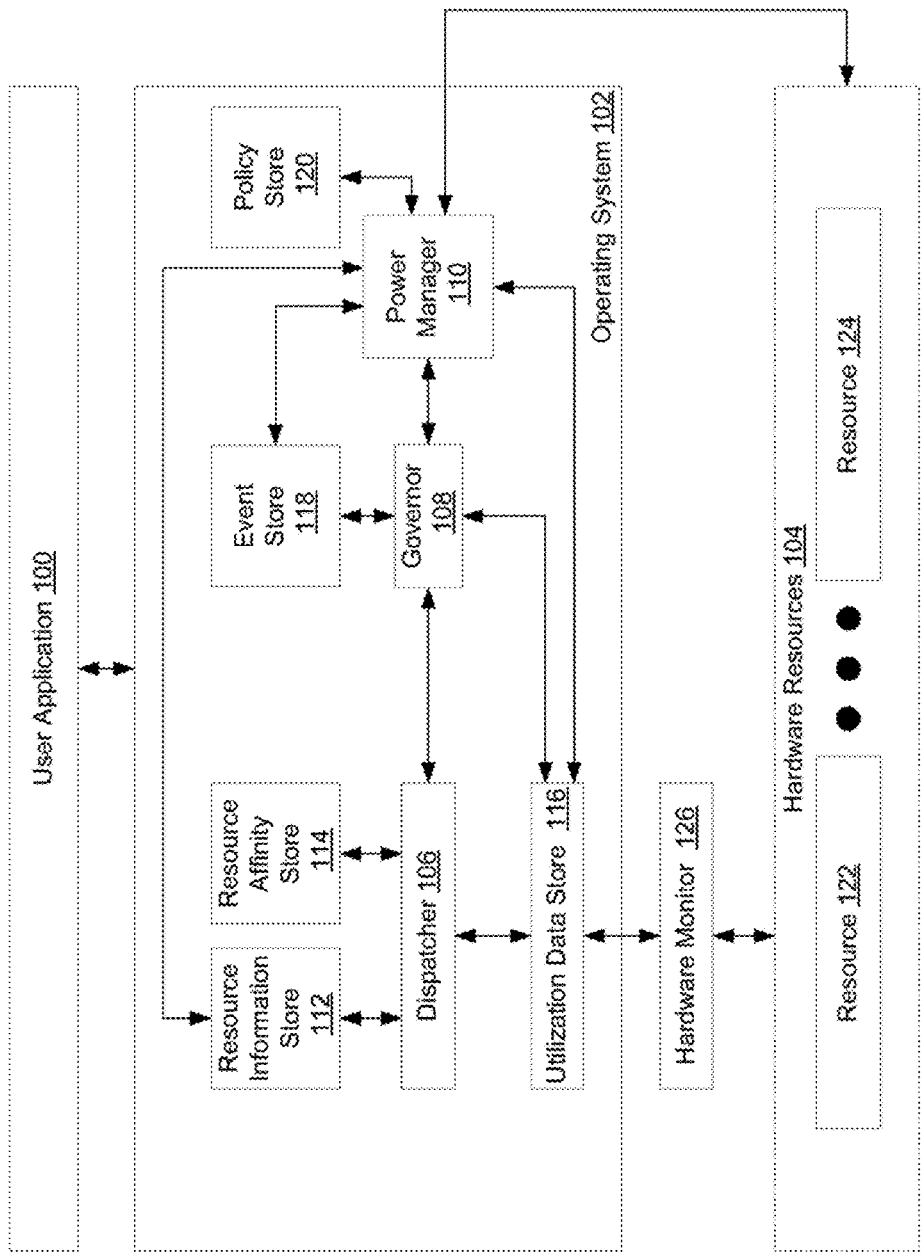
FIGS. 1a and 1b show systems used to implement event-based hardware resource management in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing hardware resources in a computer system. More specifically, embodiments of the invention are directed to dispatching a thread(s) to a hardware resource and then managing the hardware resource.

Figure 1B:
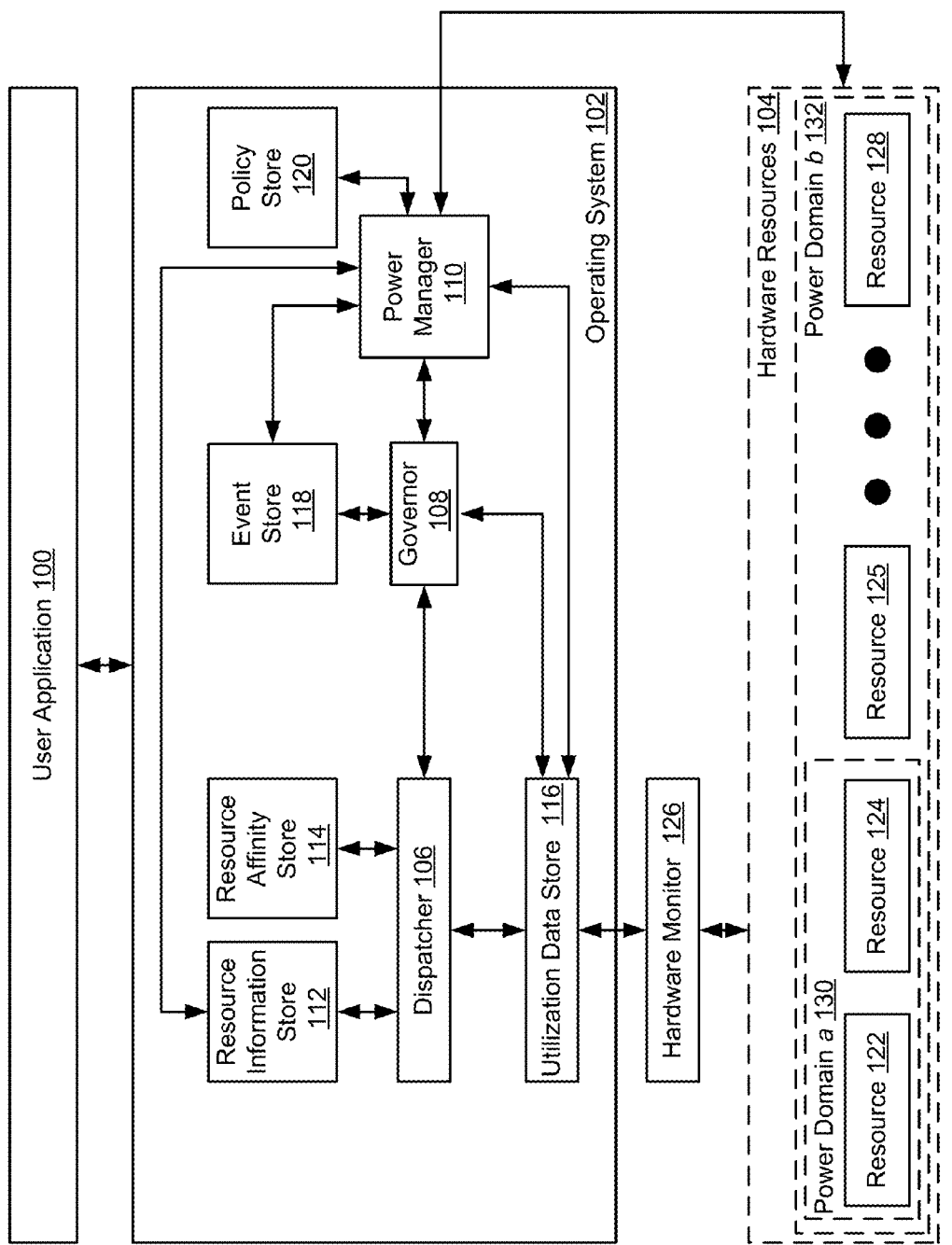

FIGS. 1a and 1b show systems in accordance with one or more embodiments of the invention. In general, FIGS. 1a and 1b both show a user application (100), an operating system (102), and a collection of hardware resources (104).

User Application

In one or more embodiments of the invention, a user application (100) exists in the software layer of the system with which the user interacts. The user application (100) may be, for example, any application that provides a benefit or attempts to solve a problem and, in doing so, makes use of hardware resources (104) within a computer system. Examples of user applications may include, for example, a compiler, a database system, a web browser, a web server, a spreadsheet program, a multimedia program, a business program, or any other software. In one or more embodiments of the invention, the user application (100) may send a request to the operating system (102) to perform some task which involves the use of a hardware resource (104). As such, in one or more embodiments of the invention, the operating system (102) may provide a response to the user application request once the operating system (102) has processed the request.

Operating System

In one or more embodiments of the invention, the operating system (102) is configured to receive, process, and provide a response to a request from the user application (100). Accordingly, the operating system (102) may serve as an interface between the user level application (100) and hardware resources (104). In view of this, a request received from the user application (100) by the operating system (102) may involve use of a hardware resource (104). In addition, the operating system (102) may require use of the hardware resource (104) for its own administrative purposes (i.e., not in response to a request from a user application (100)). As such, the operating system is configured to manage and use a hardware resource (104) either in response to a request received from a user application (100) or under the operating system's (102) own self-direction. To effectively manage and use a hardware resource (104), the operating system (102), in one or more embodiments of the invention, is configured to create and send a request and receive a response from the hardware resource (104).

Figure 4:
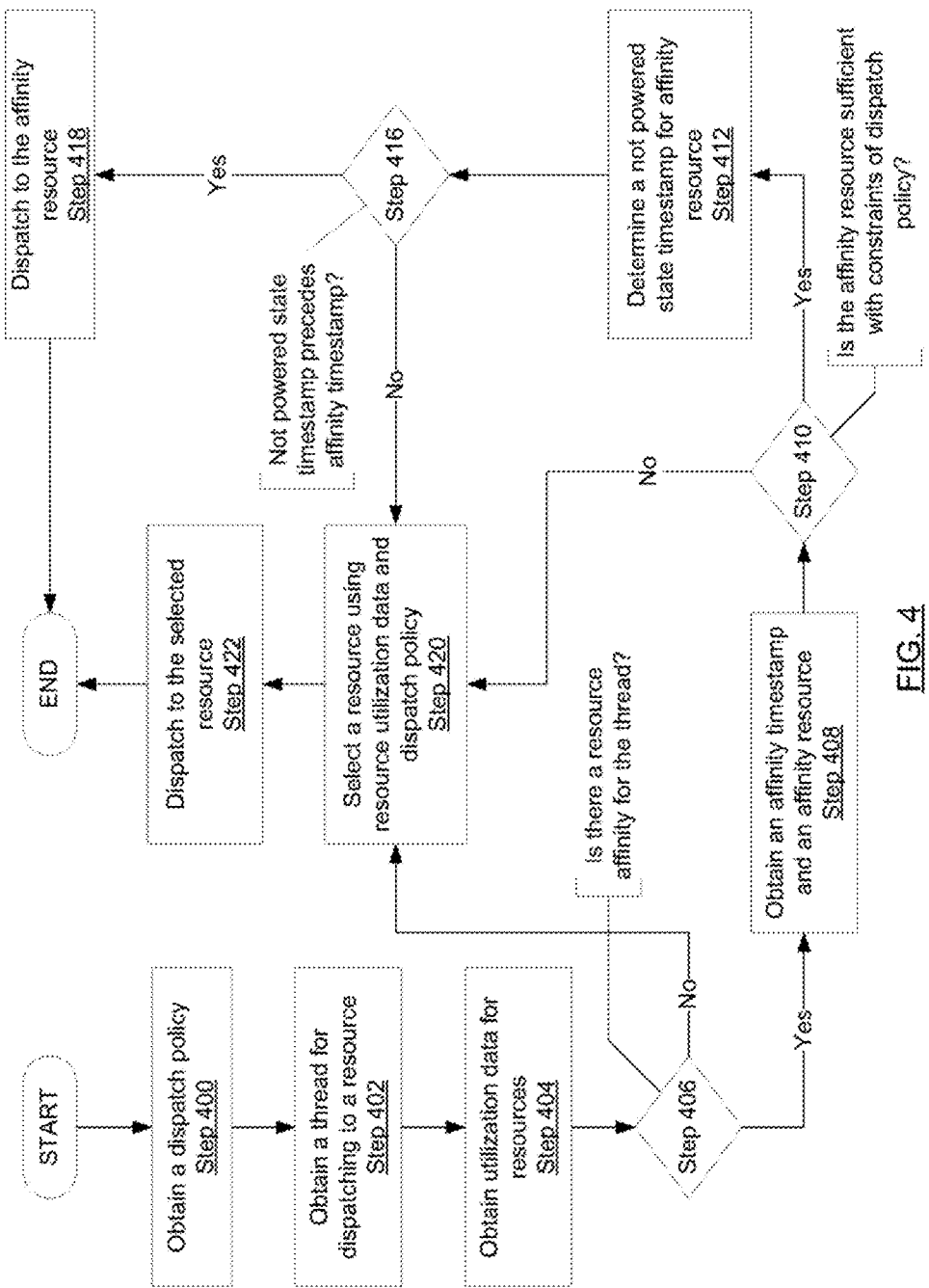
Figure 5:
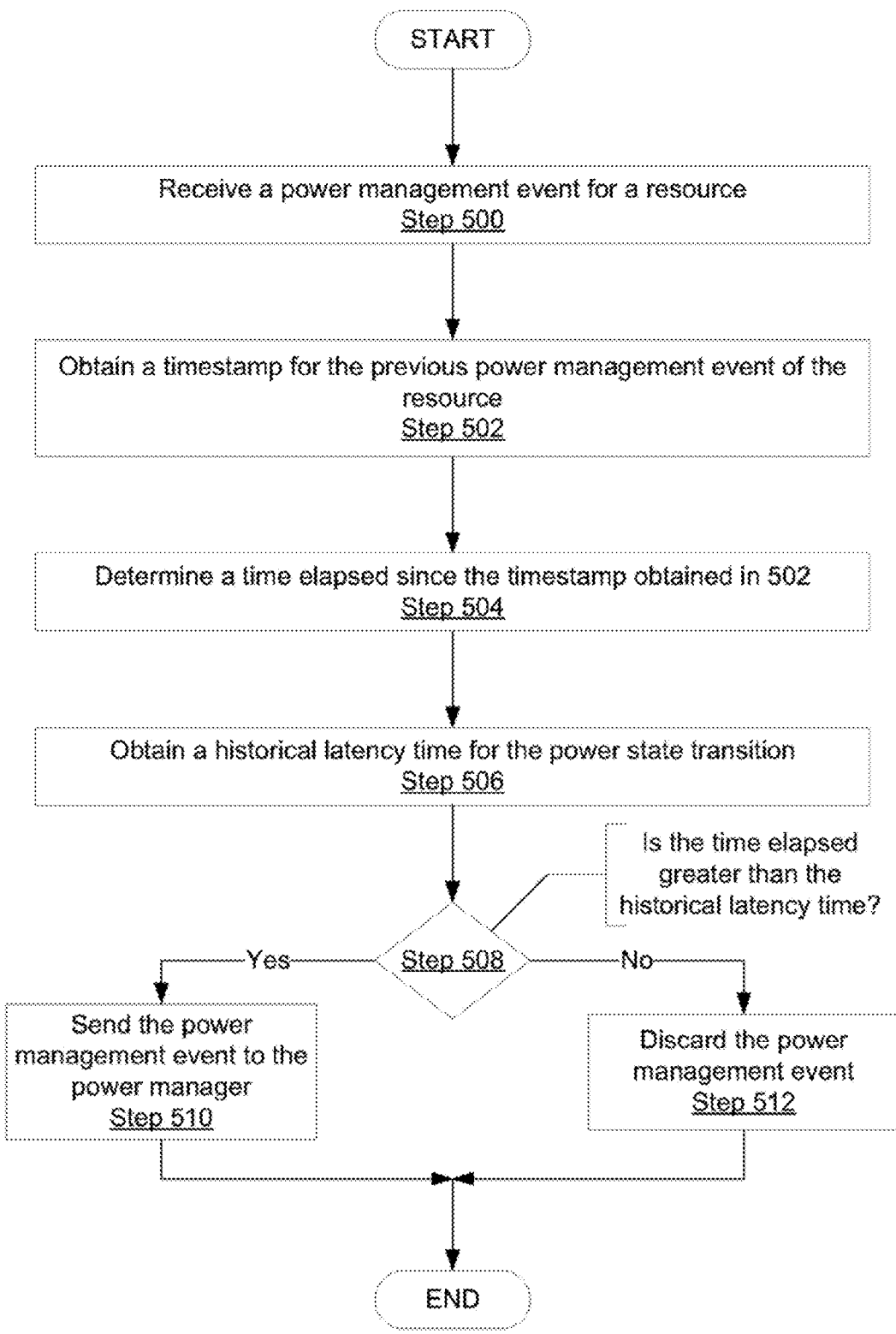
Figure 6:
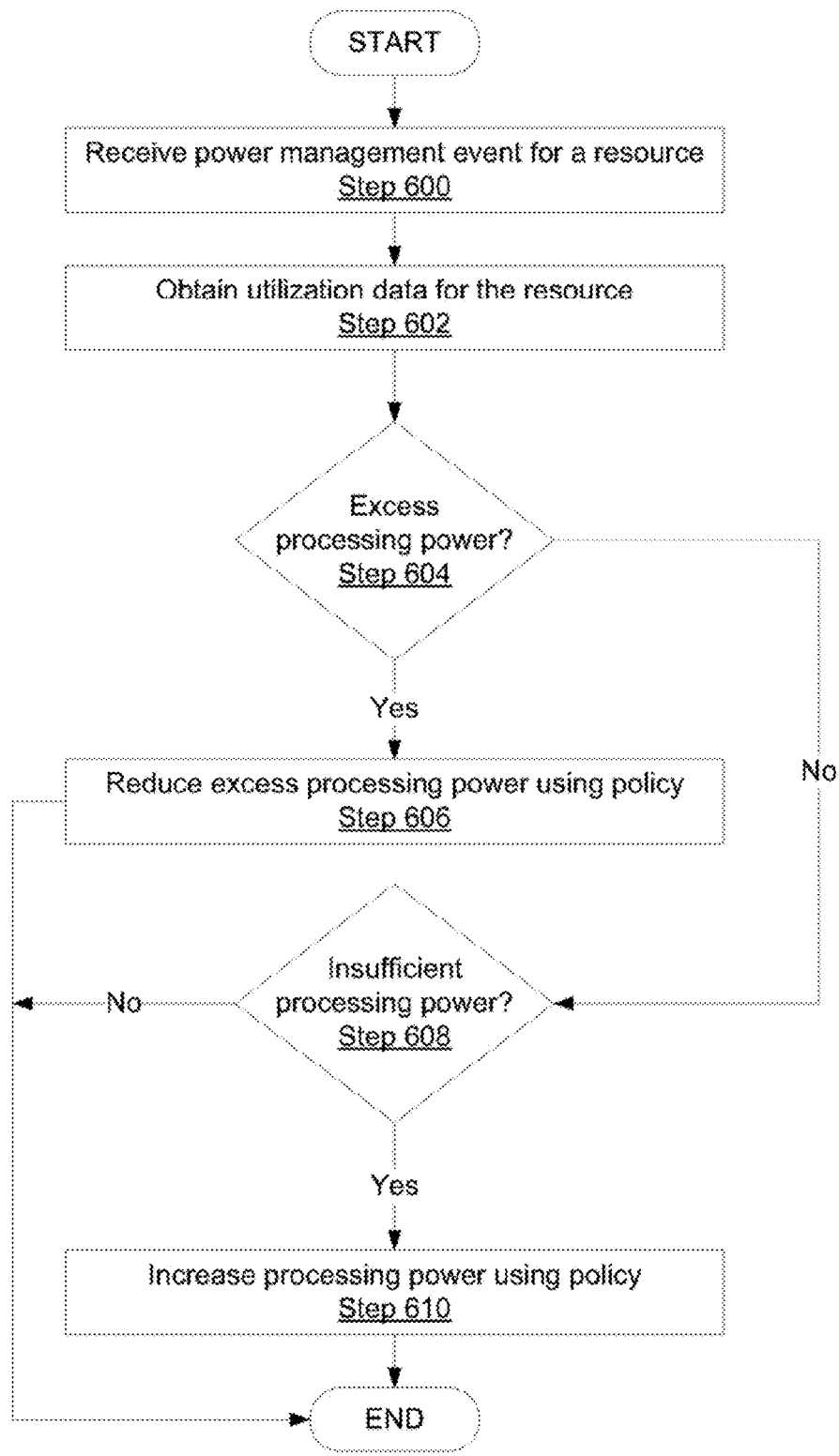

In facilitating its management and use of hardware resources (104), the operating system (102) makes use of the mechanisms described in relation to FIGS. 4, 5, and 6. In one or more embodiments of the invention, these mechanisms involve one or more of the following components of an operating system (i.e., as shown in FIGS. 1a and 1b): a resource information store (112), a resource affinity store (114), a dispatcher (106), a utilization data store (116), a governor (108), an event store (118), a power manager (110), and a policy store (120).

In one or more embodiments of the invention, the resource information store (112) is configured to store information pertaining to hardware resources (104) in the computer system. For example, the stored information may include an enumeration of all the hardware resources (104) in the computer system. The stored information may further include resource topology information descriptive of how hardware resources (104) may be grouped according to a hierarchy of power domains (130, 132). In one or more embodiments of the invention, the resource information store (112) is further configured to provide the stored information in response to receiving a request.

In one or more embodiments of the invention, the resource affinity store (114) is configured to store information pertaining to an association between a thread and a hardware resource (104). For example, in one or more embodiments of the invention, an entry stored by the resource affinity store (114) may identify a particular thread with a particular hardware resource (104) and a timestamp associated with when the particular thread last completed executing on the particular hardware resource (104). In one or more embodiments of the invention, the resource affinity store (114) is further configured to provide a resource affinity entry in response to receiving a request.

In one or more embodiments of the invention, the utilization data store (116) is configured to store resource utilization information for a particular hardware resource (104). For example, in one or more embodiments of the invention, the utilization data store (116) is configured to receive the current power state for a hardware resource (104) from a hardware monitor (126) operatively connected with the hardware resource (104). As such, the utilization data store (116) upon receipt of the power state receive a timestamp from the hardware monitor. Accordingly, in one or more embodiments of the invention, an entry stored by the utilization data store (116) may identify a particular hardware resource (104) with a current power state for the particular hardware resource (104) and a timestamp associated with when the particular hardware resource (104) transitioned to the current power state. In one or more embodiments of the invention, the utilization data store (116) is further configured to provide hardware resource utilization information for a particular hardware resource (104) in response to receiving a request.

In one or more embodiments of the invention, the dispatcher (106) is configured to send a request to and receive a response from the resource information store (112) for purposes of obtaining information pertaining to hardware resources (104) in the computer system. Further, the dispatcher (106) is configured to send a request to and receive a response from the resource affinity store (114) for purposes of obtaining information pertaining to an association between a thread and a hardware resource (104). Further, the dispatcher (106) is configured to send a request to and receive a response from the utilization data store (116) for purposes of obtaining information pertaining to resource utilization information for a particular hardware resource (104). In addition, the dispatcher (106) is configured to create and send a power management event to a governor (108). More details pertaining to the dispatcher (106) will be provided in relation to FIG. 4. Those skilled in the art will appreciate that the system may include multiple dispatchers (e.g., one per type of hardware resource or one per grouping of hardware resources) or a single dispatcher configured to interact with all hardware resources.

In one or more embodiments of the invention, the event store (118) is configured to store power management event information. For example, in one or more embodiments of the invention, the event store (118) is configured to receive a power management event from a power manager (110) when the power manager (110) has finished processing the power management event. Further, the event store (118) is configured to receive a request from and provide a response to the governor (108) for purposes of providing a power management event stored by the event store (118).

In one or more embodiments of the invention, the governor (108) is configured to receive a power management event from the dispatcher (106). Further, the governor (108) is configured to send a request to and receive a response from the event store (118) for purposes of obtaining a stored power management event information. In one or more embodiments of the invention, the governor (108) is configured to send a power management event to the power manager (110). More details pertaining to the governor (108) are provided in relation to FIG. 5.

In one or more embodiments of the invention, the policy store (120) is configured to store a power management policy. In one embodiment of the invention, the power management policy defines how the dispatcher (106) dispatches threads based on system information and/or user-preferences. Further, the power management policy defines how the power manager (110) should initiate a decrease in power consumption of processors and/or initiate an increase of processing performance of processors in the system. In one embodiment of the invention, increasing processing performance of a processor corresponds to increasing the rate at which instructions are processed by the processor.

The following are examples of various power management policies. The following power management policies are included for exemplary purposes only and should not be construed as limiting the invention.

Example Power Management Policy 1 (e.g., power capping)—The policy specifies a maximum allowed power consumption, which is less than the total of the maximum power consumption of all processors in the system. The policy also specifies how to coalesce/migrate the threads to a subset of available processors and power down the unused processors. The policy may be augmented to take into account all (or additional) power consumption related to executing the threads on the processors. For example, the policy may take into account power consumption of the cooling mechanisms associated with the processors (e.g., power to run fans to cool the processors). The policy may also be augmented to initially decrease the power consumption of the processors by decreasing the clock speed (as opposed to completely powering down the processors).

Example Power Management Policy 2 (e.g., elastic or maximum performance with minimum power consumption)—This policy provides processing power as needed; however, utilization data is used to determine whether there is insufficient processing power or excess processing power. The policy includes maximum processing latency requirements, which are used to determine whether there is insufficient processing power. The policy also includes utilization ranges, which are used to determine whether there is insufficient processing power or excess processing power. This policy may be augmented to define how to increase processing power and/or how to decrease processing power. For example, to increase processing power, the policy may define which processors to power up and the clock speed of each of the processors once they are powered up. Further, the policy may define the rate at which the processors are powered up and/or the rate at which the clock speed is increased. With respect to decreasing processing power, the policy may define how to decrease the clock speed and/or power supplied to the processor and the rate at which the decrease occurs. Further, the policy may also include functionality to coalesce/migrate threads prior to decreasing the power supplied to a given processor.

Example Power Management Policy 3—This policy defines how to dispatch threads based on the power state of each of the processors in the system. For example, as power state of a given processor changes, this information is used by the dispatcher to dispatch threads in a manner that maximize performance. For example, consider a system that includes two processors: processor 1 and processor 2. Processors 1 and 2 are initially operating at full power. Based on another power management policy (e.g., Example Power Management Policy 2), power supplied to processor 2 is decreased resulting in processor 2 transitioning to a slower processing rate (i.e., operating at a decreased clock speed). The dispatcher is notified of this change and when a subsequent high priority computing intensive thread is to be dispatched, the dispatcher sends the thread to processor 1 as opposed to processor 2. Similarly, if a low priority thread is to be dispatched, the dispatcher may send the thread to processor 2 so as to reserve processor 1 for processing of high priority threads. The power state of each of the processors may be sent to the dispatcher via a notification mechanism, when a power state of a given processor changes. In this manner, the dispatcher may rapidly adjust the manner in which threads are dispatched to continue to maximize performance.

Example Power Management Policy 4—This policy specifies how to increase power supplied to the processors in order to maximize the performance of the processors. Said another way, the policy specifies how to increase power such that there is a maximum increase in the resulting performance of the processors. For example, consider a system that includes four processors and assume that 20 units of additional power are available to supply to the processors. This policy is used to determine whether all the additional power is provided to one of the four processors, whether the additional power is evenly distributed across all four processors, or if the additional power is distributed across the four processors (or subset thereof) in an another manner. This policy may be used in conjunction with another policy (e.g., Example Power Management Policy 2).

Example Power Management Policy 5—This policy specifies environmental and/or external factors to take into account when the dispatching threads. For example, the policy may specify the maximum operating temperature for a given processor and/or for all processors in a system. Further, the policy may take into account the total power consumption of all systems in a rack, where the dispatcher is located in one of the system. In the later scenario, the power manager may implement a power savings policy (e.g., Example Power Management Policy 1) to decrease the overall power consumption of the rack.

Example Power Management Policy 6—This policy defines when specific power management policies should be applied and the duration for which they are applied. For example, this policy may specify that between 6:00 am and 6:00 pm Example Power Management Policies 2 and 4 should be applied and between 6:01 pm and 5:59 am Example Power Management Policy 1 should be applied.

Example Power Management Policy 7—This policy specifies how the power manager may account for factors external to the system itself but are within the power management scope of a rack or a data center in which the system is located. For example, the policy may be directed to power capping the rack or the data center as a whole. Further, the policy may account for machine relationships that persist for systems (i.e., machines) located within the same rack or data center. For example, if a certain machine is presently under-utilized, the policy may provide for an increase in power for other machines within the same rack or data center at the expense of the under-utilized component. In addition, the policy may consider an entire rack or data center as the root node of a hierarchy of power domains. As such, a power management adjustment for a particular machine may be considered in view of the power domains (and other machines contained therein) for which that particular machine is associated.

Those skilled in the art will appreciate that any of the aforementioned policies may be pre-defined in the operating system, provided by the user, and/or modified by the user.

In one or more embodiments of the invention, the policy store (120) is configured to receive a request from and provide a response to the power manager (110) for purposes of providing a power management policy stored by the policy store (120).

In one or more embodiments of the invention, the power manager (110) is configured to adjust power consumption for a hardware resource (104) in the computer system. As such, in one or more embodiments of the invention, the power manager (110) is configured to receive and process a power management event. Further, in one or more embodiments of the invention, the power manager (110) is configured to send a request to and receive a response from a policy store (120) for purposes of obtaining a power management policy. In addition, in one or more embodiments of the invention, the power manager (110) is configured to send a request to and receive a response from the resource information store (112) for purposes of obtaining information pertaining to hardware resources (104) in the computer system. In one or more embodiments of the invention, the power manager (110) is configured to send a request to and receive a response from the utilization data store (116) for purposes of obtaining information pertaining to current utilization information of hardware resources (104). Further, as a function of obtaining and processing the aforementioned information, the power manager (110) is configured to send a request to a hardware resource (104) for purposes of transitioning the hardware resource (104) to a new power state. More details pertaining to the power manager (110) are provided in relation to FIG. 6.

Hardware Resources

Hardware resources (104) are configured to in at least the following two processing states: active and idle. Further, the hardware resources are configured to receive a request from an operating system (102) in accordance with one or more embodiments of the invention. The hardware resource (104) may be, for example, a memory device, a CPU, or any other hardware device capable of receiving a request from the operating system (102). In one or more embodiments of the invention, the hardware resource (104), after processing the request, may provide a response to the operating system (102). By way of receiving and responding to requests from the operating system (102), a hardware resource (104) may be effectively managed by the operating system (102).

One example of resource management is power management, which involves the adjustment of the power state for a hardware resource (104). In one or more embodiments of the invention, a power state for a hardware resource (104) may be defined as powered up or not powered. In one or more embodiments of the invention, a power state for a hardware resource (104) may be defined with additional levels of granularity as to how much power the hardware resource (104) is currently receiving (e.g., full power, 75% power, 50% power, 25% power, and not powered (i.e., off). In one or more embodiments of the invention, levels of granularity may be defined by a frequency and a voltage for the hardware resource (104). In the context of a CPU resource, for example, levels of granularity may be defined in accordance with enumerated C-states and P-states. In the context of a hard disk resource, for example, levels of granularity may be defined according to a platter speed and a voltage level.

Further, hardware resources (104) may be power-managed by the operating system (102) both individually and collectively in groups in accordance with one or more embodiments of the invention. For example, FIGS. 1a and 1b show at least four hardware resources (122, 124, 125, and 128). Each of these hardware resources may be power-managed by the operating system (102) independently, which means that each hardware resource may be configured to its own power state independent of the power state of any other hardware resource. In addition, hardware resources (104) may be power-managed collectively by the operating system (102) when one or more hardware resources (104) are grouped together in a power domain (130, 132).

A power domain (130, 132) represents a set of power manageable hardware resources (104) for which power management state changes are coordinated across the hardware resources (104) in the power domain (130, 132). For example, a multi-core processor may support operation at a variety of frequencies and voltages. As such, all the cores in the processor package must change clock frequencies together if the clock signal is to be shared by all the cores. Accordingly, all the cores would share a single power domain.

In another example, consider a multi-core processor where clock frequency may be independently controlled on a per-core basis but voltage can only be changed on a per-processor package basis. Further, in order for all the cores in the processor package to operate at a certain low voltage, all the cores must run at a sufficiently low clock frequency. Accordingly, a first power domain exists at the core level whereas a second, and hierarchically higher, power domain exists at the processor package level. While reducing the clock frequency for some but not all the cores in the processor package does in fact reduce the overall power consumption, an even greater reduction may be attainable when all the cores are operating at a sufficiently low clock frequency which, in turn, allows a decrease in voltage for the processor package as a whole. As such, when work is delegated to CPU cores in the described system, there is a potential power-savings benefit in utilizing the smallest number of processor packages so that power management is operative at more of a per-processor package level than a per-core level.

Returning to the figures, FIG. 1*b* shows a first power domain a (130) which includes merely two hardware resources (122, 124) and a second power domain b (132) which includes all the hardware resources (104). Accordingly, in one or more embodiments of the invention, when the operating system (102) manages power domain b (132), all the hardware resources (104) in that power domain may be uniformly managed. Further, when the operating system (102) manages power domain a (130), all the hardware resources (122, 124) in that power domain likewise are uniformly managed.

FIGS. 2*a* through 2*d* show data structures maintained in accordance with one or more embodiments of the invention.

Figure 2A:
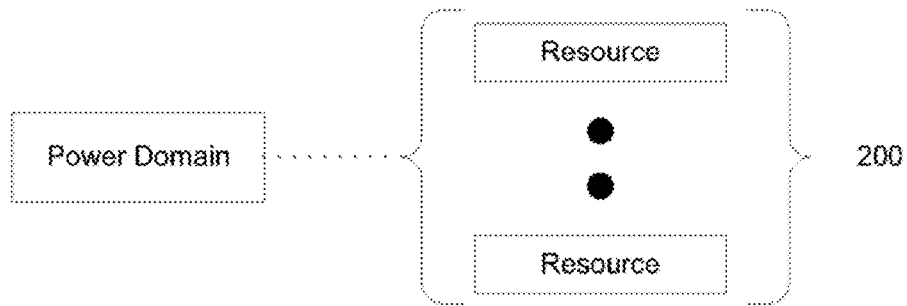
FIGS. 2a through 2d show data structures used to implement event-based hardware resource management in accordance with one or more embodiments of the invention.

FIG. 2*a* shows a data structure (200) used in accordance with one or more embodiments of the invention to collectively associate a group of hardware resources (identified in the date structure using a resource identifier (ID)) together as a power domain. In one or more embodiments of the invention, the data structure (200) of FIG. 2*a* may be stored and maintained by a resource information store as shown in FIGS. 1*a* and 1*b*.

Figure 2B:
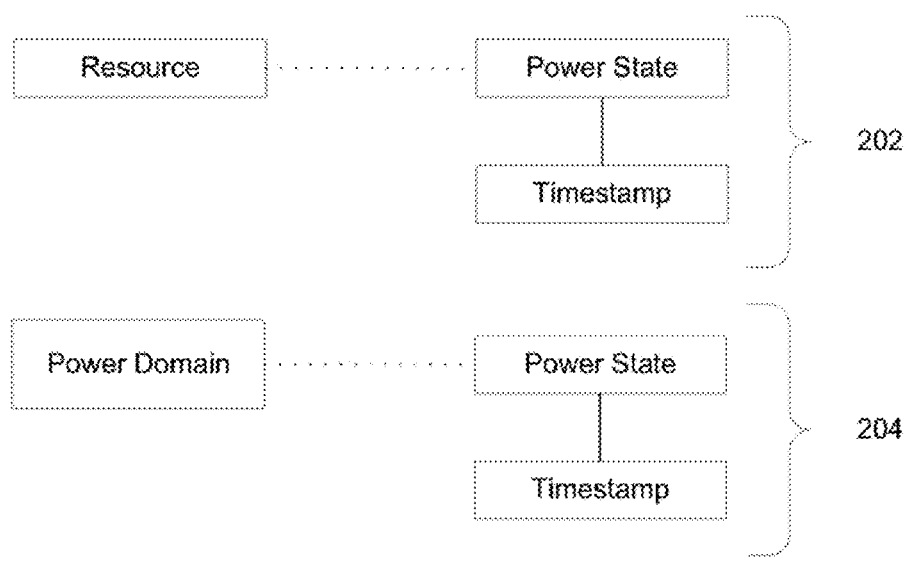

FIG. 2*b* shows data structures (202, 204) used in accordance with one or more embodiments of the invention to associate a hardware resource or a power domain with a current power state and a timestamp recording when that hardware resource or power domain transitioned to the current power state. In one or more embodiments of the invention, the data structures (202, 204) of FIG. 2*b* may be stored and maintained by a utilization data store as shown in FIGS. 1*a* and 1*b*.

Figure 2C:
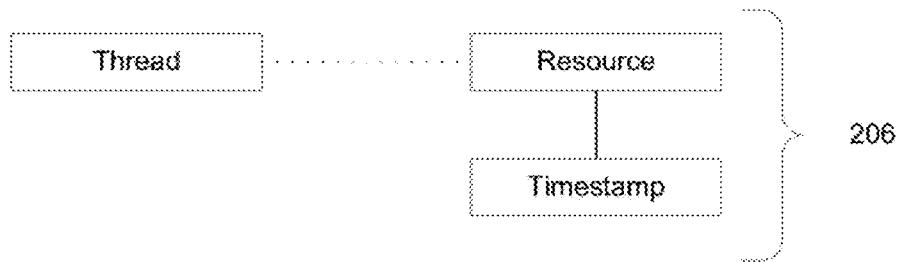

FIG. 2*c* shows a data structure (206) used in accordance with one or more embodiments of the invention to associate a thread (denoted using a thread identifier (ID)) with a hardware resource (denoted using a resource ID) and a timestamp recording when the thread last completed executing on the hardware resource. In one or more embodiments of the invention, the data structure (206) of FIG. 2*c* corresponds to the data structure for a resource affinity entry, which may be stored in a resource affinity store as shown in FIGS. 1*a* and 1*b*.

Figure 2D:
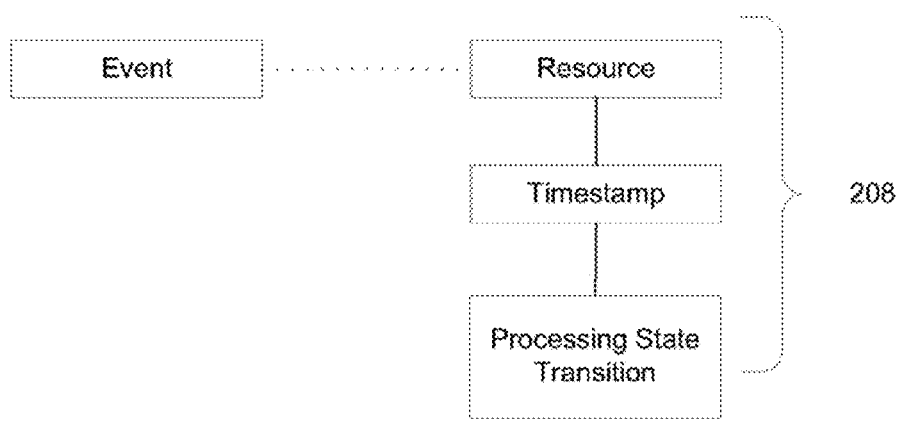
Figure 3:
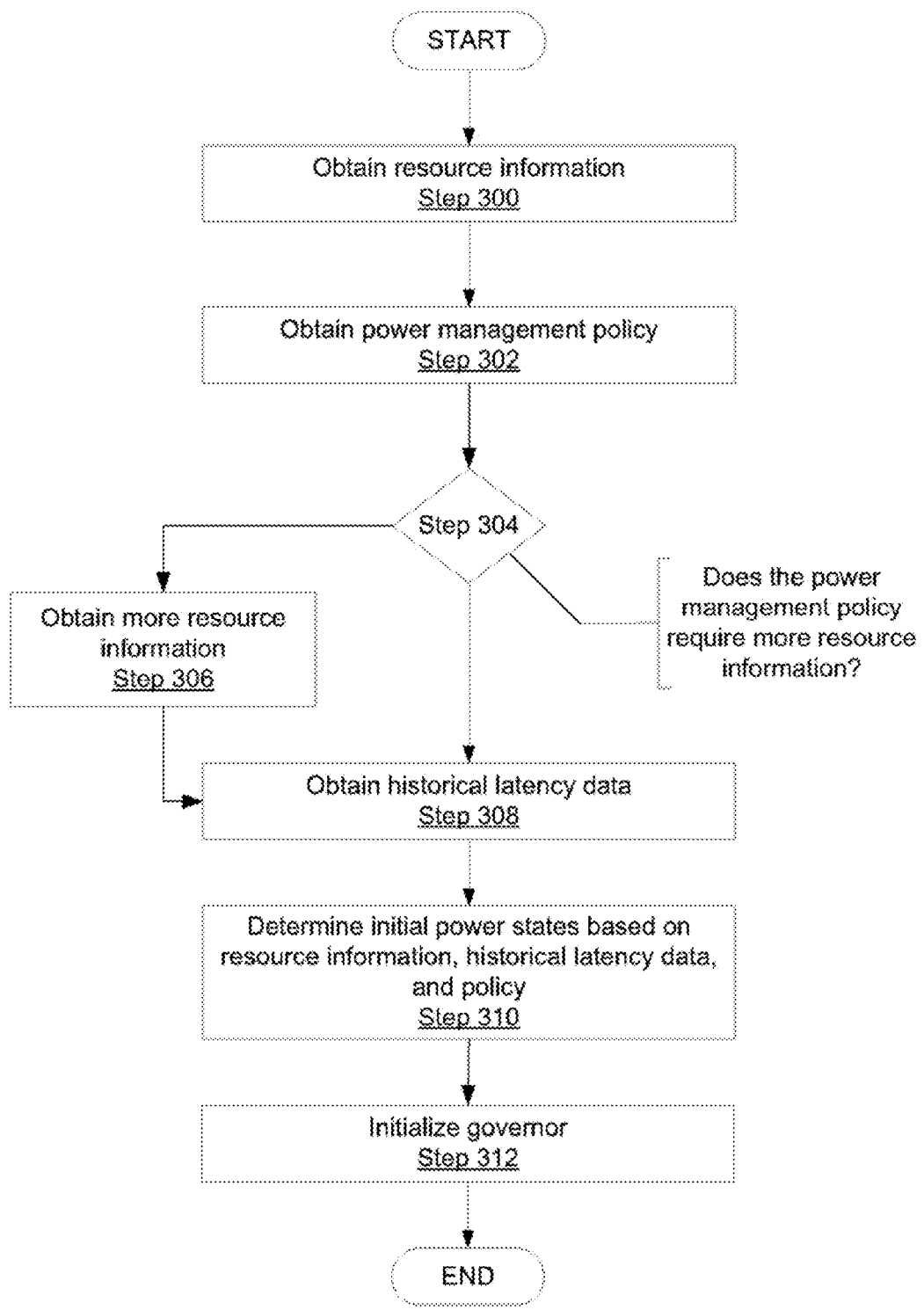
FIGS. 3 through 6 show flowcharts in accordance with one or more embodiments of the invention. More specifically.

FIG. 2*d* shows a data structure (208) used in accordance with one or more embodiments of the invention to associate a power management event with a hardware resource, a timestamp for when the power management event was created, and the processing state transition (e.g., active to idle, idle to active). In addition, the processing state transition may include idle to idle when the hardware resource remains idle for a prolonged period of time. In one or more embodiments of the invention, the data structure (208) of FIG. 2*d* may be created by a dispatcher and stored in an event store as shown in FIGS. 1*a* and 1*b*.

In one or more embodiments of the invention, a system as shown in FIG. 1 may be a "static" system if information pertaining to the hardware resources and available power states for the system remain unchanged during execution. As such, information maintained by the system in the resource information store (i.e., the data structure of FIG. 2*a* for example) does not change during execution.

Alternatively, in other embodiments of the invention, a system may be a "dynamic" system in that the information pertaining to hardware resources and power states is subject to change while the system is executing. For example, a thermal, battery, or power-supply event may alter the availability of one or more hardware resources. In addition, the availability of a given hardware resource may be altered based on the issuance of a fault or virtualization reallocation (i.e., altering which virtual resources are mapped to which hardware resources). Further, such an event may change (i.e., increase or decrease) the availability of power states for a hardware resource. As such, in one or more embodiments of the invention, the use of a power management policy (i.e., as maintained in the policy store of FIG. 1) is responsive to events that have power management implications in a dynamic system. Said another way, changes in the availability of one or more hardware resources and/or the availability of one or more power sources for a hardware resource may require the selection of a different power management policy that is more suitable in light of the dynamic operations context for the system.

FIGS. 3 through 6 show a flowchart in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation. The process shown in FIG. 3 may be used, for example, to set up a computer system in accordance with one or more embodiments of the invention.

In Step 300, resource information is obtained. In one or more embodiments of the invention, resource information may include a listing or an enumeration of all the hardware resources in the computer system. In one or more embodiments of the invention, power domains may also be specified to group all (or a portion) of the hardware resources such that the grouped hardware resources may be uniformly power-managed. In one or more embodiments of the invention, the hardware resource information is obtained from a resource information store as shown in FIGS. 1*a* and 1*b*.

In Step 302, a power management policy is obtained. In one or more embodiments of the invention, the power management policy is the power management policy specified, for example by the operating system or administrator, as the default power management policy. In one or more embodiments of the invention, the power management policy is selected as a function of available system utilization, performance information, and/or using any other information. In one or more embodiments of the invention, the power management policy is obtained from the policy store as shown in FIGS. 1*a* and 1*b*.

In Step 304, a determination is made as to whether a sufficient amount of information is available to implement the power management policy. For example, in one or more embodiments of the invention, using a power management policy to determine whether a hardware resource requires transitioning to a new power state may require a set of inputs. Accordingly, Step 304 determines whether the available information is sufficient to complete the set of inputs required for using the power management policy. If the available information is sufficient to use the power management policy, then the method proceeds to Step 308. Alternatively, if the available information is insufficient to use the power management policy, then the method proceeds to Step 306.

In Step 306, more information is obtained to complete the set of inputs required to use of the power management policy.

In Step 308, historical latency data is obtained. In one or more embodiments of the invention, historical latency data includes an average, a maximum, or a minimum elapsed time for a power management state transition request to be serviced. Historical latency data may be determined in any number of ways. For example, historical latency data may be collected as part of an enumeration of resource power states during initialization. Alternatively, historical latency data may be determined by active measurement during initialization. Further, historical latency data may be provided by an external source in the form of one or more tables or data structures. In addition, historical latency data may be collected on a continuous basis during the course of system execution. For example, as power management state transitions are requested, the actual time to service these requests may be determined and maintained so as to provide a "moving" (i.e., up to date) average. An example of historical latency data, and how it may vary depending on the power management state transition, is provided below.

| An Example of Historical Latency Data | |
|---|---|
| Active operating state → Shallow inactive operating state | 100 μsec |
| Active operating state → Deep sleep inactive operating state | 100 μsec |
| Shallow inactive operating state → Active operating state | 100 μsec |
| Deep sleep inactive operating state → Active operating state | 10 msec |

In one or more embodiments of the invention, historical latency data may be stored and maintained by the governor. As such, the governor may be initialized with initial historical latency data during initialization. Further, as the system executes, this data may be updated to account for power management state transition requests that have been serviced since the time. Alternatively, in one or more other embodiments of the invention, historical latency data may be maintained as part of an entry in the event store (as shown in FIG. 1).

Returning to FIG. 3, initial power states are determined in Step 310 for one or more hardware resources in the computer system using resource information, the power management policy, and historical latency data. In one or more embodiments, initial power states are generally provided via the system firmware and/or BIOS. As such, hardware resources are placed in an initial power state before the operating system starts.

In Step 312, the governor is initialized. In one or more embodiments of the invention, initializing the governor may involve requesting for and subsequently receiving initial power states and historical latency data for each of the hardware resources in the computer system. In another embodiment of the invention, initial power states and historical latency data for hardware resources may be read from a table or data structure or provided by a firmware or a BIOS.

Referring to FIG. 4, the process shown in FIG. 4 may be used, for example, to dispatch a thread to a hardware resource. In Step 400, a dispatch policy is obtained. In one or more embodiments of the invention, the dispatch policy determines a hardware resource for dispatching a thread to based, in part, upon resource utilization data.

In Step 402, a thread is obtained for dispatching to a hardware resource. In Step 404, utilization data for all (or a portion) of the hardware resources is obtained. In one or more embodiments of the invention, utilization data is obtained from a utilization data store as shown in FIGS. 1a and 1b. In one or more embodiments of the invention, the obtained utilization data comprises a current power state for each hardware resource in the computer system. In one or more further embodiments of the invention, the utilization data is includes entries similar to those depicted by the data structures of FIG. 2b.

In Step 406, a determination is made about whether there is a resource affinity for the thread obtained in Step 402. In one or more embodiments of the invention, this determination is made based, in part, upon whether a resource affinity entry is stored for the thread in the resource affinity store as shown in FIGS. 1a and 1b. Accordingly, in one or more further embodiments of the invention, the dispatcher (as shown in FIGS. 1a and 1b) sends a request to and receives a response from the resource affinity store for the purposes of determining whether the particular thread obtained in Step 402 is associated with a particular hardware resource by a resource affinity entry as shown in the data structure of FIG. 2c. If a resource affinity entry is found for the thread, then the method proceeds to Step 408. Otherwise, if a resource affinity entry is not found for the thread, then the method proceeds to Step 420.

In Step 408, a hardware resource for which the thread has an affinity for and a timestamp recorded when the thread last completed executing on the hardware resource are obtained. In one or more embodiments of the invention, the aforementioned hardware resource and timestamp are obtained from a resource affinity entry (which may stored in accordance with the data structure shown in FIG. 2c) associated with the thread and stored in the resource affinity store.

In Step 410, a determination is made as to whether the hardware resource qualifies for dispatching the thread to under the particular constraints of the dispatch policy obtained in Step 400. In one or more embodiments of the invention, the dispatch policy presents a criteria for a hardware resource using the resource utilization data obtained in Step 404. As such, if the hardware resource defined by the resource affinity entry (i.e., the hardware resource of Step 408) does not qualify under the dispatch policy, then the method proceeds to Step 420. Otherwise, if the hardware resource defined by the resource affinity entry does qualify under the dispatch policy, the method proceeds to Step 412.

In Step 412, a last transition for the hardware resource to a not powered state (or another low powered state in which the cache associated with the hardware resource is cleared) is determined. In one or more embodiments of the invention, this determination is made, in part, by sending a request to the event store as shown in FIGS. 1a and 1b. In one or more further embodiments of the invention, the event store may respond to the request with the most recently stored information related to the last time the power state for the hardware resource was in a not powered state (or another low powered state in which the cache associated with the hardware resource is cleared). In one embodiment of the invention, the aforementioned information may be stored in a data structure such as the one shown in FIG. 2b. In one embodiment of the invention, the cache may correspond to cache associated with a processor (e.g., L1, L2 caches), a cache associated with a system (e.g., disk cache, web cache, BIND DNS daemon cache, database cache, etc), or any other type of cache.

In Step 416, a comparison is made between the timestamp of Step 408 and timestamp of Step 414. If the timestamp of Step 414 precedes the timestamp of Step 408, then the method proceeds to Step 418. Otherwise, if the timestamp of Step 414 does not precede the timestamp of Step 408, then the method proceeds to Step 420.

In Step 418, the thread is dispatched to the hardware resource determined in Step 408 (i.e., the hardware resource with which the thread has an affinity with). In Step 420, a hardware resource is selected using the hardware resource utilization data of Step 404 and the obtained dispatch policy of Step 400. Then, in Step 422, the thread of Step 402 is dispatched to the selected hardware resource of Step 420. Now that a thread has been dispatched to a hardware resource, the process of FIG. 4 is complete.

In one or more embodiments of the invention, the process of FIG. 4 may be used to dispatch threads to hardware resources in a computer system as a function of both thread-resource affinity and current resource utilization data. For example, implementations utilizing thread-resource affinity minimize overhead costs associated with the migration of threads from one hardware resource to another. Rather than absorbing a cost of rebuilding a context for the executing thread at a new hardware resource, associating a thread with a hardware resource at which the thread has previously executed results in improved cache utilization due to utilization of information relevant to that thread that is already stored at the hardware resource. However, circumstances where a hardware resource has been transitioned to a not powered state (or another low powered state in which the cache associated with the hardware resource is cleared) present a possible consequence in the loss of the context information for a thread that was previously stored at the hardware resource. Accordingly, losing context information for a thread at the hardware resource may offset some of the benefits of preserving a thread-resource affinity at that hardware resource. In one or more embodiments of the invention, the process of FIG. 4, and more specifically Step 416, contemplate whether a thread-resource affinity entry stored for a particular thread at a particular hardware resource is meaningful in light of the power states of that hardware resource.

Further, in view of the hardware resource topology, hardware resources may belong to more than one power domain. For example, a particular resource may belong to a low level power domain that includes a total of four resources. Further, the same resource may belong to a higher level power domain that includes a total of eight resources. Accordingly, when the hardware resource transitions to a low power state, it is possible for the hardware resource to lose affinity with the low level power domain while still maintaining affinity for the high level power domain depending upon the operative contexts in each of the two power domains described.

Referring to FIG. 5, the process shown in FIG. 5 may be used, for example, to filter out power management events that are representative of transient idle and transient work. Transient idleness may be, for example, when a thread briefly yields a hardware resource to wait for an event elsewhere in the computer system. Transient work may be, for example, kernel background activity. In either case, the overhead required to make a power state transition for the hardware resource is not justified in view of the brief time during which the hardware resource may function in a giving processing state.

In Step 500, a power management event is received. In one or more embodiments of the invention, the received power management event includes a hardware resource to be transitioned to a target power state, a timestamp for when the power management event was created, and the target power state. In one or more embodiments of the invention, the power management event is created by the dispatcher (i.e., as shown in FIGS. 1a and 1b) as a result of dispatching a thread to a hardware resource.

In Step 502, a timestamp is obtained for when the hardware resource (i.e., hardware resource to be transitioned to the target power state, as specified by the power management event received in Step 500) transitioned to its current power state. In one or more embodiments of the invention, the timestamp associated with when the hardware resource transitioned to its current power state is stored as part of the utilization data for the hardware resource in the utilization data store as shown in FIGS. 1a and 1b.

In Step 504, a time elapsed value is determined using the timestamp associated with when the hardware resource transitioned to its current power state (i.e., the timestamp of Step 502). In one or more embodiments of the invention, the time elapsed value represents the difference in time between the present time and the timestamp of Step 502.

In Step 506, a historical latency time value is obtained. In one or more embodiments of the invention, the historical latency time is associated with how much time has been historically required to transition the hardware resource from the current power state to the target power state specified by the power management event of Step 500. In one embodiment of the invention, the target power state transition, is the power state to which the power manager would transition the hardware resource based on the current power management policy implemented by the power manager.

In Step 508, a comparison is made involving the historical latency time of Step 506 and the elapsed time of Step 504. In one or more embodiments of the invention, when the historical latency time is greater than the elapsed time, then the method proceeds to Step 512. Alternatively, in one or more embodiments of the invention, when the historical latency time is not greater than the elapsed time, then the method proceeds to Step 510.

In Step 510, the power management event received in Step 500 is sent to the power manager. In Step 512, the power management event received in Step 500 is discarded (i.e., not sent to the power manager). In one or more embodiments of the invention, the governor as described above either (i) sends power management events onward to a power manager or (ii) discards the power management events such that the discarded events are never received by the power manager in accordance with FIG. 5. In doing so, the governor has the ability to "throttle" the events which the power manager uses to determine whether to transition hardware resources from one power state to another by selectively discarding those power management events that are likely to be transient in nature. In one embodiment of the invention, the ability to limit which power management events are sent to the power manager may prevent the hardware resource from thrashing (i.e., rapidly changing the power state of the hardware resource upon receipt of each power management event generated in the system).

In one embodiment of the invention, the manner in which the governor determines whether to (i) send power management events onward to a power manager or (ii) discard the power management events such that the discarded events are never received by the power manager may be referred to as a throttle policy. Further, the power management event may be said to satisfy the throttle policy when the governor determines that the power management event should be sent to the power manager and to not satisfy the throttle policy when the governor determines that the power management event should not be sent to the power manager. As such, the determination of whether the throttle policy is satisfied may be made using the previous power management event for the resource. Alternatively, the determination of whether the throttle policy is satisfied may be made using a number of previous power management events for the resource.

In one or more embodiments of the invention, the governor is adaptive. For example, if the governor has the capability to self-evaluate decisions involving sending or discarding power management events (i.e., Steps 508-512). In doing so, the governor may track incorrect transitions and, accordingly, disable governing functions momentarily or permanently. An example of this is provided in the pseudocode provided below. The following pseudocode is not intended to limit the scope of the invention.

| Pseudocode for Governor |
|---|
| ```
if (transitions_governed == TRUE) {
    if (time_since_last_governed_transition > transient_interval) {
        /*
         * We governed the last transition and we shoudn't have,
         * since we were in this state for long enough that the
         * state transition would have been worthwhile.
         */
        incorrect_governed_transitions_count++;
        if (incorrect_governed_transitions_count >=
            governor_threshold) {
            /*
             * There's enough non-transience to justify removing
             * an installed governor.
             */
            incorrect_governed_transitions_count = 0;
            transitions_governed = FALSE;
        }
    } else {
        /*
         * We correctly governed the last transition, since we
         * were only transiently resident in the previous state.
         */
        incorrectly_governed_transitions_count = 0;
    }
    /*
     * Don't allow transition to new state...transitions are governed.
     */
}
if (transitions_governed == FALSE) {
    if (time_since_last_transition <= transient_interval) {
        /*
         * We're changing power states, too soon after the last
         * transition.
         */
        transient_transitions++;
        if (transient_transitions >= governor_threshold) {
            /*
             * There's enough transient transitions to justify
             * governing future ones.
             */
            transient_transitions = 0;
            transitions_governed = TRUE;
        }
    } else {
        /*
         * We remained in the previous state long enough to
         * to be worth the overhead of the previous transition.
         */
        transient_transitions = 0;
``` |

| Pseudocode for Governor |
|---|
| ```
    }
    allow_transition_to_new_state();
}
``` |

Referring to FIG. 6, the process shown in FIG. 6 may be used, for example, transition a hardware resource from a current power state to a target power state.

In Step 600, a power management event is received. In one or more embodiments of the invention, the received power management event includes a hardware resource to be transitioned to a target power state, a timestamp for when the power management event was created, and the target power state. In one or more embodiments of the invention, the power management event is created by the dispatcher as a result of dispatching a thread to a hardware resource and forwarded to the power manager by the governor as a result of a determination that the event is a non-transient power management event (i.e., an event sent from the governor at Step 510).

In Step 602, utilization data is obtained for the hardware resource. In one or more embodiments of the invention, utilization data is obtained from a utilization data store as shown in FIGS. 1a and 1b. In one or more embodiments of the invention, the obtained utilization data comprises a current power state for each hardware resource in the computer system. In one or more further embodiments of the invention, the utilization data is comprised of entries similar to those depicted by the data structures of FIG. 2b.

In Step 604, a determination is made as to whether excess power is being used by the hardware resource before transitioning the hardware resource to the target power state of the received power management event. In one or more embodiments of the invention, this determination is made using the utilization data obtained in Step 602 and the power management policy obtained in Step 302 of FIG. 3. If excess power is being used, then the method proceeds to Step 606. Otherwise, if excess power is not being used, then the method proceeds to Step 608. In one or more embodiments of the invention, the determination of Step 604, as described above, is made when the power manager (i.e., as shown in FIGS. 1a and 1b) is operating in an advisory request mode. As such, the power management event received in Step 600 is treated as an advisory notification that is considered in view of current utilization data and the power management policy.

Alternatively, if the power manager is operating in an explicit request mode, the transitioning of the hardware resource to the target power state as described in the power management event. As such, the current utilization data and power management policy are not considered by the power manager and the effect of Step 604 becomes whether or not the transition to the target power state described by the power management event is to a lower power state (relative to the current power state).

In Step 606, the power state for the hardware resource is decreased according to the power management policy in advisory request mode. Alternatively, in an explicit request mode, the power state for the hardware resource is adjusted in view of the target power state of the power management event.

In Step 608, a determination is made as to whether insufficient power is being used by the hardware resource. In one or more embodiments of the invention, this determination is made using the utilization data obtained in Step 602 and the power management policy obtained in Step 302 of FIG. 3. If insufficient power is being used, then the method proceeds to Step 610. Otherwise, if excess power is not being used, then a power state transition is not required for the hardware resource and the process of FIG. 6 ends. As is described in relation to Step 604, the above-described determination is made when the power manager is operating in the advisory request mode. Accordingly, the power management event received in Step 600 is treated as an advisory notification that is considered in view of current utilization data and the power management policy.

Alternatively, if the power manager is operating in an explicit request mode, the transitioning of the hardware resource to the target power state as described in the power management event. As such, the current utilization data and power management policy are not considered by the power manager and the effect of Step 608 becomes whether or not the transition to the target power state described by the power management event is to a higher power state (relative to the current power state).

In Step 610, the power state for the hardware resource is increased according to the power management policy in advisory request mode. Alternatively, in an explicit request mode, the power state for the hardware resource is adjusted in view of the target power state of the power management event. As the hardware resource has been transitioned to a new power state, the process of FIG. 6 ends. In one or more embodiments of the invention, the process shown in FIG. 6 may be performed by the power manager as shown in FIGS. 1a and 1b.

FIGS. 7 and 8a through 8c show graphs in accordance with one or more embodiments of the invention. The graphs are not intended to limit the scope of the invention.

Figure 7:
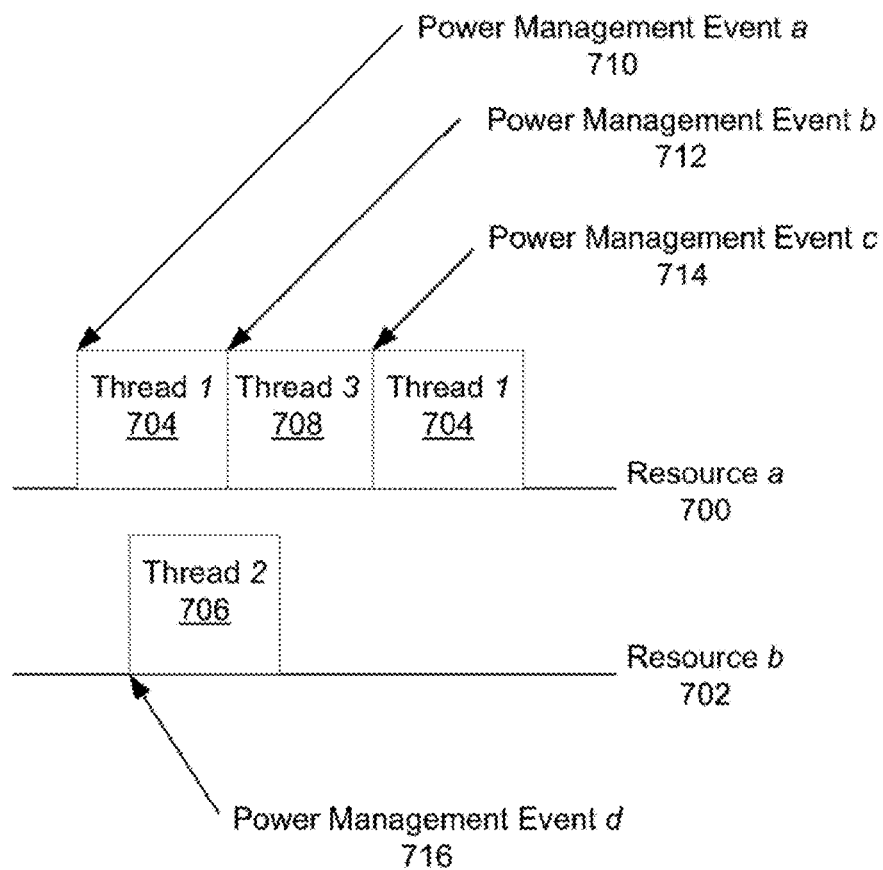
FIGS. 7 and 8a through 8c show graphs in accordance with one or more embodiments of the invention. More specifically.

Referring to FIG. 7, the graph shown in FIG. 7, for example, may be read as a timeline from left to right. Specifically, FIG. 7 shows two hardware resources (a: 700; and b: 702) and three threads (1: 704; 2:706; and 3:708). At the outset, there no threads (704-708) executing on either of the hardware resources (700, 702). Further, for the purposes of this example, assume that the system has just been through the initialization process as described in relation to FIG. 3. Accordingly, no thread-resource affinities are presently stored for either hardware resource (700, 702) in a resource affinity store as shown in FIGS. 1a and 1b. Finally, with respect to the hardware resource, both hardware resources only have two power states: full power and not powered. In addition, both hardware resources are initially at the full power state.

Dispatching Thread 1

After some time, a dispatcher (i.e., as shown in FIGS. 1a and 1b) obtains Thread 1 (704) for dispatching to a hardware resource to perform some task (i.e., Step 402 of FIG. 4). Because there is no resource affinity for Thread 1 (704) at this time, a hardware resource is selected for Thread 1 (704) by the dispatcher using resource utilization data obtained for all the hardware resources (i.e., Step 404 of FIG. 4) and a dispatch policy (i.e., Step 400 of FIG. 4). Accordingly, as shown in FIG. 7, Thread 1 (704) is dispatched to Resource a (700) (i.e., Resource a selected in accordance with Step 420 of FIG. 4 and the dispatch of the thread to Resource a in accordance with Step 422 of FIG. 4).

In addition, the dispatcher creates a power management event in response to dispatching Thread 1 (704) to Resource a (700). Specifically, in this instance, the dispatcher creates Power Management Event a (710), as shown in FIG. 7, specifying Resource a (700), as idle to active, and a timestamp associated with when Power Management Event a (710) was created.

Dispatching Thread 2

As with Thread 1 (704), Thread 2 (706) is not yet associated with any particular hardware resource (700, 702) by way of a stored resource affinity entry in the resource affinity store. As such, when the dispatcher obtains Thread 2 (706) for dispatching to a hardware resource, the hardware resource is selected for Thread 2 (706) by the dispatcher using resource utilization data obtained for all the hardware resources and a dispatch policy. In particular, Resource a (700) is being utilized at this time by Thread 1 (704). Accordingly, as shown in FIG. 7, Thread 2 (704) is dispatched to Resource b (702).

In addition, the dispatcher creates a power management event in response to dispatching Thread 2 (706) to Resource b (702). Specifically, in this instance, the dispatcher creates Power Management Event d (716), as shown in FIG. 7, specifying Resource b (702), as idle to active, and a timestamp associated with when Power Management Event d (716) was created.

Thread 1 Releases Resource a

Thread 1 (704) completes execution on Resource a (700). Accordingly, the dispatcher creates another power management event (not shown in FIG. 7) to transition Resource a (700) from an active power state to an idle power state. Specifically, in this instance, the created power management event specifies Resource a (700), active to idle, and a timestamp associated with when the power management event was created.

Further, a resource affinity entry is stored in a resource affinity store (i.e., as shown in FIGS. 1a and 1b) by the dispatcher. Specifically, the resource affinity entry associates Thread 1 (704) with Resource a (700) and a timestamp corresponding to when Thread 1 (704) completed executing on Resource a (700).

Dispatching Thread 3

As with Threads 1 and 2 (704, 706), Thread 3 (708) is not yet associated with any particular hardware resource (700, 702) by way of a stored resource affinity entry in the resource affinity store. As such, when the dispatcher obtains Thread 3 (708) for dispatching to a hardware resource, the hardware resource is selected for Thread 3 (708) by the dispatcher using resource utilization data obtained for all the hardware resources and a dispatch policy. In particular, Resource b (702) is being utilized at this time by Thread 2 (706). Accordingly, as shown in FIG. 7, Thread 3 (700) is dispatched to Resource a (700).

In addition, the dispatcher creates a power management event in response to dispatching Thread 3 (708) to Resource a (700). Specifically, in this instance, the dispatcher creates Power Management Event b (708), as shown in FIG. 7, specifying Resource a (700), idle to active, and a timestamp associated with when Power Management Event b (712) was created.

Thread 2 Releases Resource b

Thread 2 (706) completes execution on Resource b (702). Accordingly, the dispatcher creates another power management event (not shown in FIG. 7) to transition Resource b (702) from an active power state to an idle power state. Specifically, in this instance, the created power management event specifies Resource b (702), active to idle, and a timestamp associated with when the power management event was created. Further, a resource affinity entry is stored in a resource affinity store by the dispatcher associating Thread 2 (706) with Resource b (702) and a timestamp for when Thread 2 (706) completed executing on Resource b (702).

Thread 3 Releases Resource a

Thread 3 (708) completes execution on Resource a (700). Accordingly, the dispatcher creates another power management event (not shown in FIG. 7) to transition Resource a (700) from an active power state to an idle power state. Specifically, in this instance, the created power management event specifies Resource a (700), active to idle, and a timestamp associated with when the power management event was created. Further, because a thread has been dispatched to a hardware resource for purposes of executing some task, a resource affinity entry is stored in a resource affinity store by the dispatcher associating Thread 3 (708) with Resource a (700) and a timestamp for when Thread 3 (708) completed executing on Resource a (700).

Dispatching Thread 1 Again

After some time, the dispatcher obtains Thread 1 (704) again for dispatching to a hardware resource to perform some task. Because there is now a resource affinity entry stored for Thread 1 (704) in the resource affinity store at this time (i.e., Step 406 of FIG. 4), a hardware resource is selected for Thread 1 (704), in part, according to the hardware resource specified in the resource affinity entry. In this instance, Thread 1 (704) has an affinity with Resource a (700). Further, a timestamp associated with when Thread 1 (704) last completed executing on Resource a (700) is obtained by the dispatcher from the resource affinity entry (i.e., Step 408 of FIG. 4). The dispatcher next determines if Resource a (700) is sufficient under the constraints of the dispatch policy (i.e., obtained in Step 400 of FIG. 4). Once Resource a (700) is deemed sufficient in view of the dispatch policy, a comparison is made between the timestamp associated with the affinity entry for Thread 1 (704) and a timestamp associated with when Resource a (700) last transitioned to a not powered state. In this case, because the timestamp associated with the resource affinity entry is clearly after any time Resource a (700) was not power, the thread-resource affinity is considered in dispatching Thread 1 (704) to Resource a (700) as shown in FIG. 7. In addition, the dispatcher also creates a power management event in response to dispatching Thread 1 (704) to Resource a (700). Specifically, in this instance, the dispatcher creates Power Management Event c (714), as shown in FIG. 7, specifying Resource a (700), idle to active, and a timestamp associated with when Power Management Event c (714) was created.

Governing Resources a and b

The governor, as shown in FIGS. 1a and 1b and described in relation to FIG. 5, receives power management events created by the dispatcher as described earlier in this example. For example, the governor receives Power Management Events a (710), b (712), and c (714) in relation to the dispatcher assigning threads to begin execution upon Resource a (700). In these instances, the power management events (710-714) specify a idle to active transitions. Further, the governor also receives power management events (not shown in FIG. 7, but described earlier in this example) that signal active to idle transitions for Resource a (700).

As described in FIG. 5, the governor is configured to receive the aforementioned power management events and determine, for example, using the method shown in FIG. 5, which of the power management events to send to the power manager. In the instant example, assuming that the historical latency to change from full power to not power is 50ms and the time elapsed between receipt of power management events for Resource a is 30ms, then none of the aforementioned power management events for Resource a are forwarded from the governor to the power manager.

Figure 8A:
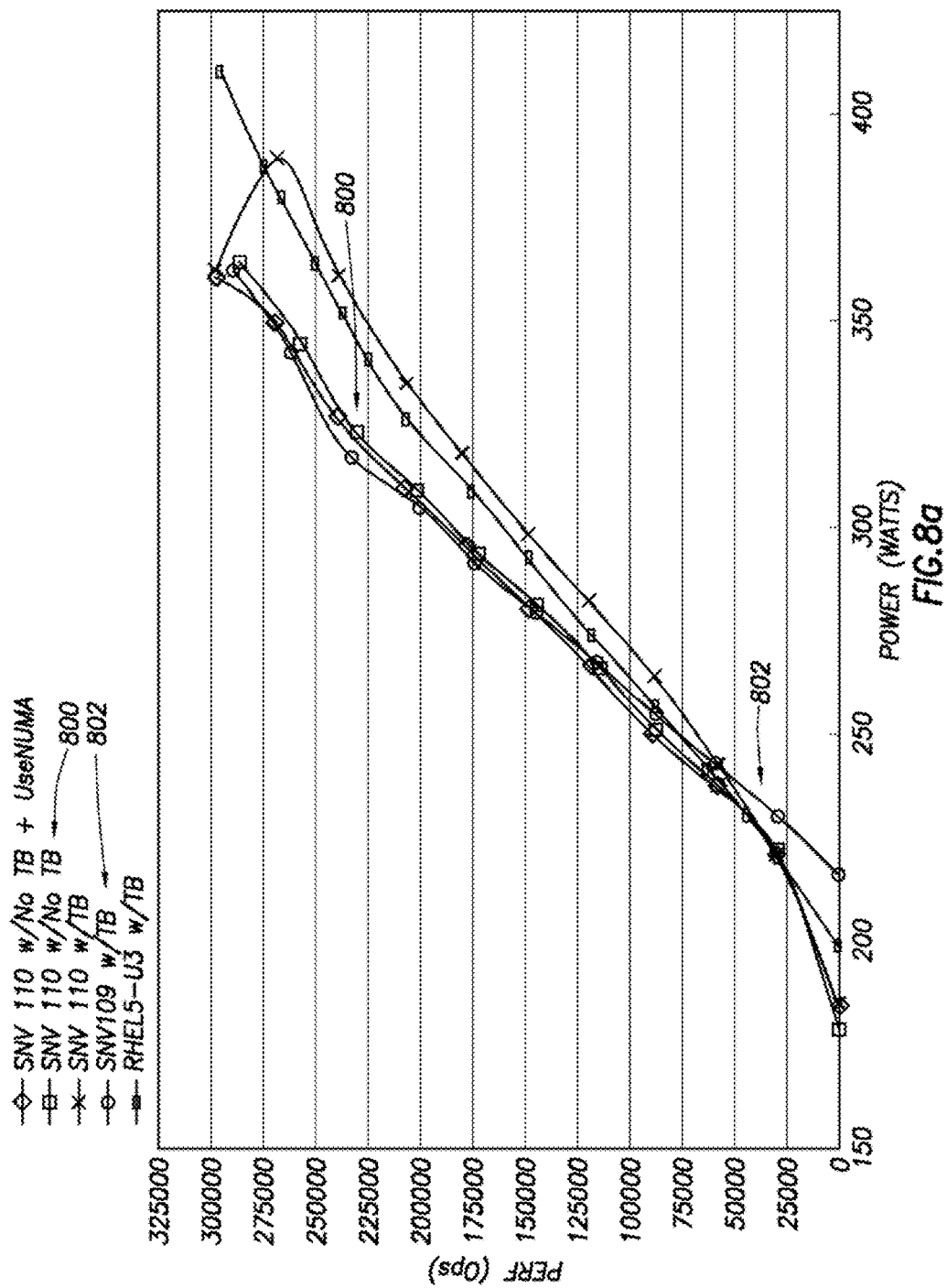
Figure 8B:
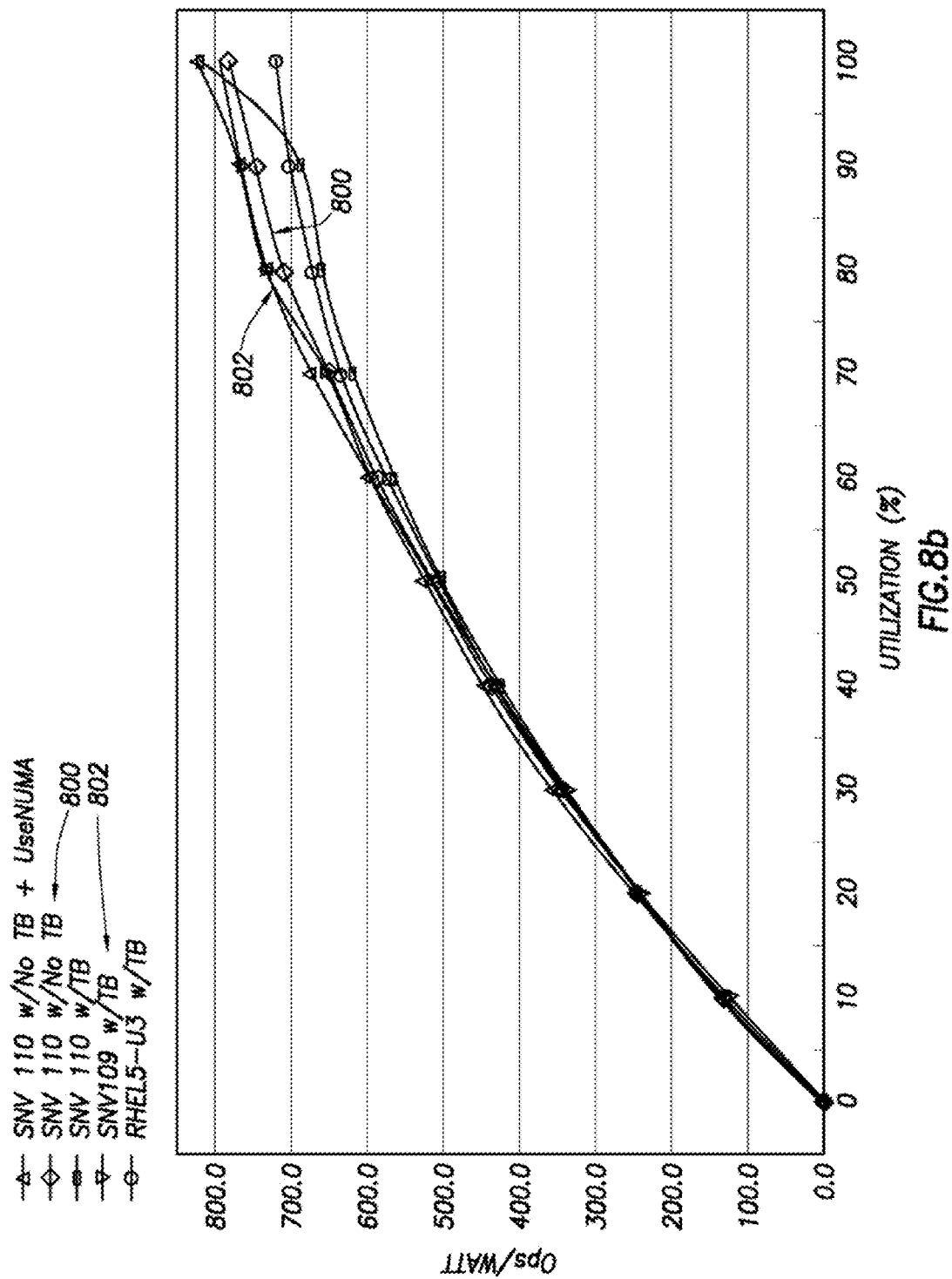
Figure 8C:
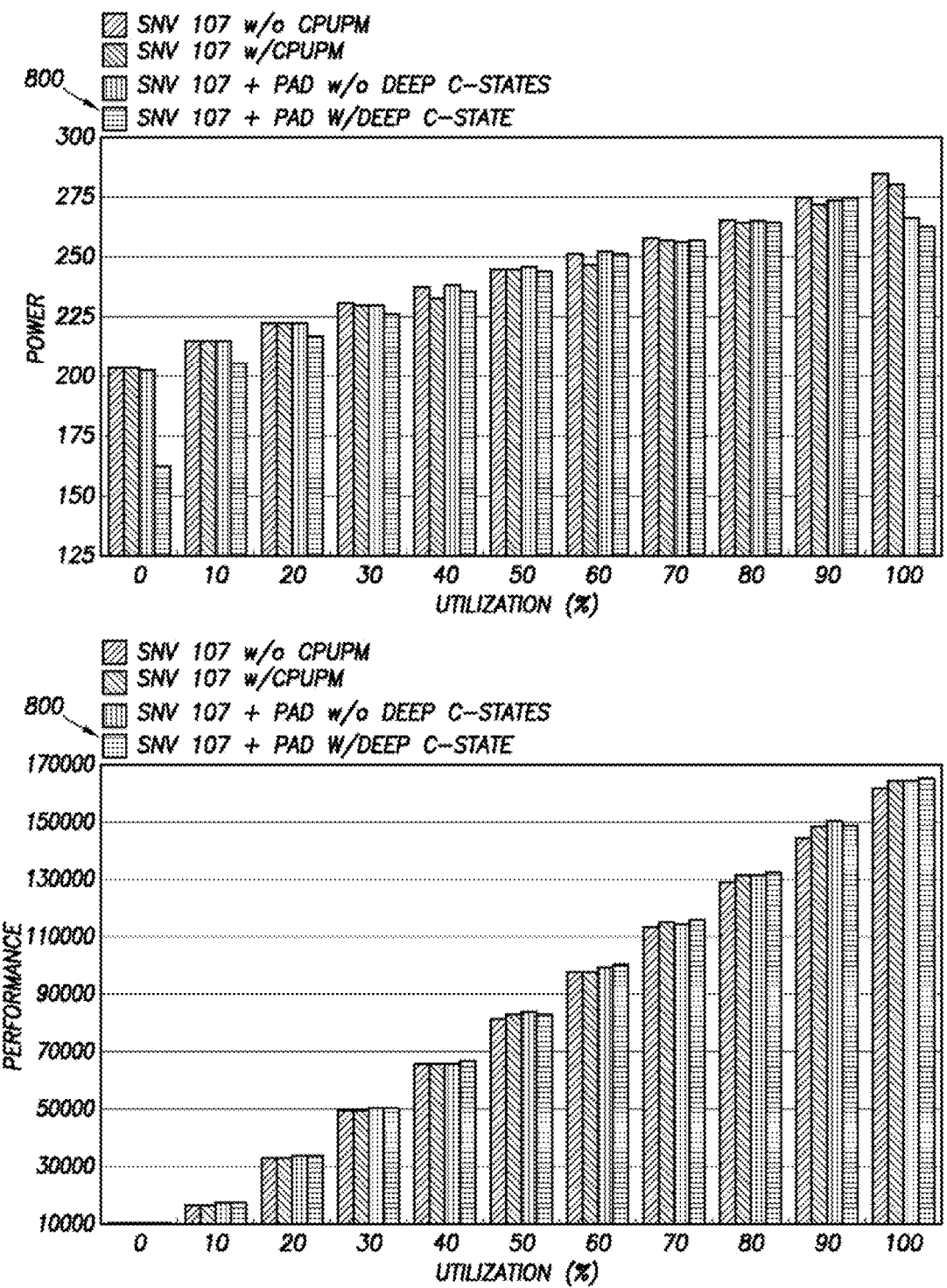

The graphs shown in FIGS. 8a through 8c, for example, depict performance benefits associated with one or more embodiments of the invention. For example, in FIG. 8a, a system that implements one or more embodiments of the (800) may be compared with a system that does not make use of the invention (802). In the range of power spanning from 0 watts to ~250-300 watts, the system (800) appears to provide more performance (operations per second) as a function of power system (802). A performance benefit is also evident in relation to FIG. 8b. For example, the system (800) provides greater utilization as a function of efficiency (operations per second per watt). The graphs of FIG. 8c show that a fully-utilized (i.e., approaching 100%) system implementing one or more embodiments of the invention shows a decrease in power consumption (i.e., the first graph) while registering a sustained increase in performance (i.e., the second graph).

Figure 9:
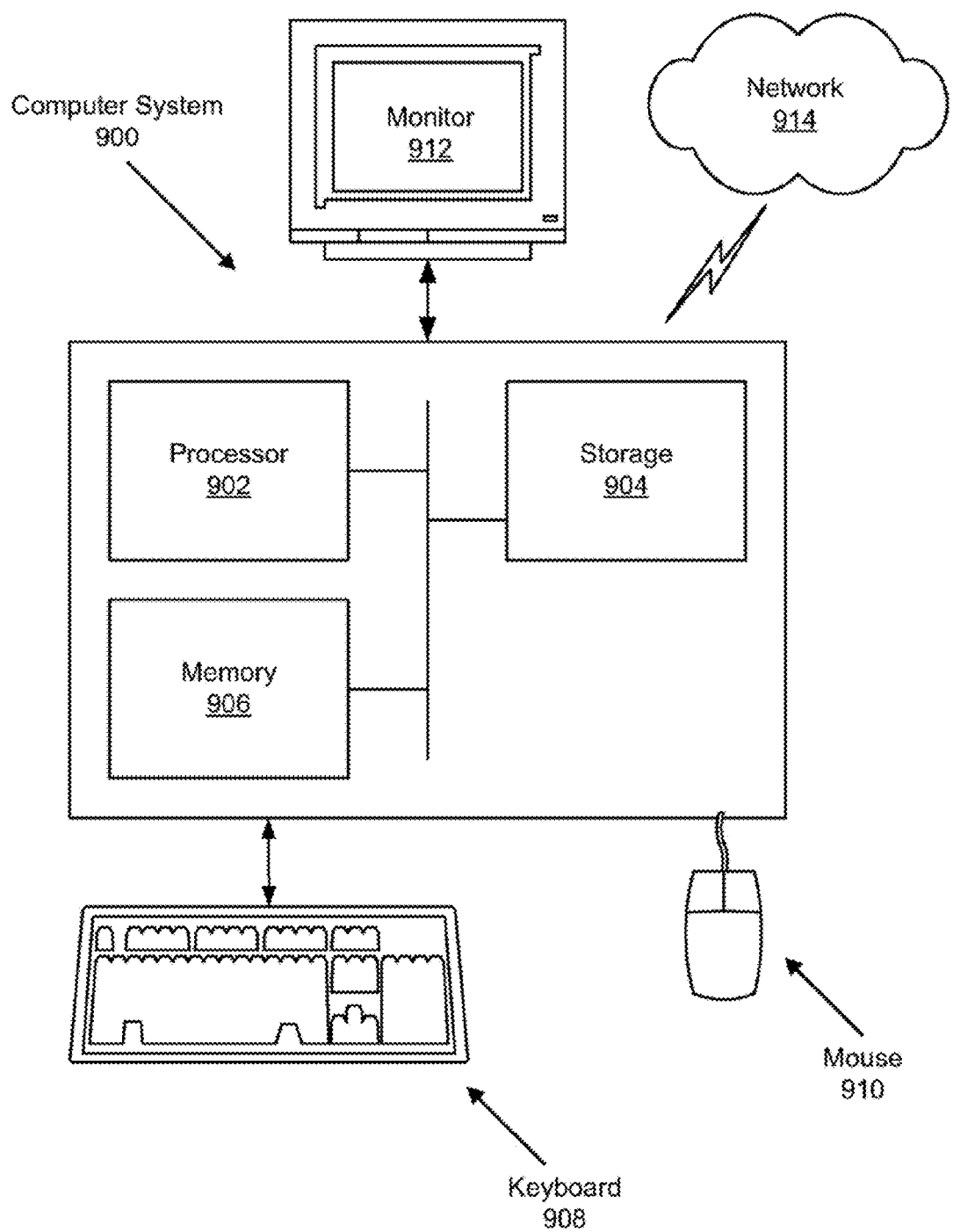
FIG. 9 shows a computer system in accordance with one or more embodiments of the invention.

Embodiments of the invention may be implemented on virtually any type of computer regardless of the platform being used. For example, as shown in FIG. 9, a computer system (900) includes one or more processors (902), associated memory (906) (e.g., random access memory (RAM), cache memory, flash memory, etc.), a storage device (904) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (914) includes at least the minimal processing, input, and/or output means necessary to practice embodiments of the invention.

Those skilled in the art will appreciate that embodiments of the invention may be applied to any hardware resource. Further, those skilled in the art will appreciate that while the above description discusses hardware resource utilization based on execution on the hardware resource, embodiments of the invention may be extended to take into account utilization of the resource. For example, if the hardware resource is a hard disk, then embodiments of the invention may be implemented using the utilization of the hard disk (e.g., reads/second, writes/second, etc.). In another example, if the hardware resource is a network interface card (NIC), then embodiments of the invention may be implemented using the utilization of NIC (e.g., packets received/second, packets sent/second, etc.).

Further, those skilled in the art will appreciate that one or more elements of the aforementioned computer system (900) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or hardware resources. Further, software instructions to perform embodiments of the invention may be stored on a computer readable medium such as a compact disc (CD), a diskette, a tape, or any other physical computer readable storage device or medium.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dispatching a thread to a resource, comprising:
   obtaining the thread by an operating system executing on a computing device, wherein the thread is associated with a request from a user application for the operating system to perform an action;
   obtaining, by the operating system, utilization data for a plurality of resources, wherein utilization data is stored in a repository and comprises at least a current power state of the plurality of resources;
   determining whether a first resource affinity entry is stored for the thread in a resource affinity store;
   identifying a first resource using the first resource affinity entry when the first resource affinity entry is stored for the thread, wherein the first resource is one of the plurality of resources, and wherein the first resource affinity entry comprises a thread identifier (ID) corresponding to the thread, the first resource ID corresponding to the first resource, and a first timestamp associated with when the thread last completed executing on the first resource;
   determining whether the first resource is qualified under a dispatch policy, wherein the dispatch policy indicates the first resource is qualified to receive a dispatched thread based at least on utilization data of the first resource;
   determining a second timestamp using utilization data when the first resource is qualified under the dispatch policy, wherein the second timestamp is associated with a time when the first resource last transitioned to a not powered state or a low powered state;
   when the second timestamp precedes the first timestamp:
   selecting the first resource for dispatching the thread to;
   dispatching the thread to the first resource and creating a power management event when the thread is dispatched to the first resource, wherein the power management event comprises a processing state transition of the first resource from the current power state to a target power state for the first resource;
   determining a third timestamp using utilization data, wherein the third timestamp is associated with a time when the first resource last transitioned to the current power state; and
   determining a time elapsed value for the first resource using the third timestamp, the time elapsed value being the difference in time between a present time and the third timestamp;
   obtaining a historical latency time value for the first resource, the historical latency time value being a time required to transition the hardware resource from the current power state to the target power state;
   comparing the time elapsed value and the historical latency time value to determine whether the power management event for the first resource satisfies a power management policy; and
   transitioning the first resource from the current power state to the target power state, when the time elapsed value is greater than the historical latency time value; and
   discarding the power management event if the elapsed time value is less than or equal to the historical latency time.

2. The method of claim 1, further comprising:
   selecting the first resource using utilization data and the dispatch policy when the first resource affinity entry is not stored for the thread.

3. The method of claim 1, further comprising:
   identifying a second resource using utilization data and the dispatch policy when the first resource affinity entry is not stored for the thread; and
   dispatching the thread to the second resource.

4. The method of claim 1, further comprising:
   identifying the second resource using utilization data and the dispatch policy when the first resource is not qualified under the dispatch policy; and
   dispatching the thread to the second resource.

5. The method of claim of claim 1, further comprising:
   identifying the second resource using utilization data and the dispatch policy when the second timestamp does not precede the first timestamp; and
   dispatching the thread to the second resource.

6. A system for managing a resource, the system comprising:
   a processor;
   a resource information store, configured to:
   store a first resource entry for a first resource among a plurality of resources;
   a resource affinity store, configured to;
   store a first resource affinity entry for a first thread, wherein the first resource affinity entry comprises a first thread identifier (ID) corresponding to the first thread, the first resource ID corresponding to the first resource, and a first timestamp associated with when the first thread last completed executing on the first resource;
   a utilization data store, configured to:
   store a first resource utilization entry, wherein the first resource utilization entry comprises a first current power state and a second timestamp, wherein the second timestamp is associated with when the first resource transitioned to a not powered state or a low powered state;
   a dispatcher, configured to:
   obtain the first thread, wherein the first thread is associated with a request from a user application to an operating system for the operating system to perform an action;
   obtain the first resource utilization entry from the utilization data store;
   determine whether the first resource affinity entry is stored for the first thread in the resource affinity store;

identify the first resource using the first resource affinity
entry when the first resource affinity entry is stored for
the first thread;
determine whether the first resource is qualified under a
dispatch policy, wherein the dispatch policy indicates
that the first resource is qualified to receive a dispatched thread based at least on utilization data of the
first resource;
determine the second timestamp using the first resource
utilization entry when the first resource is qualified
under the dispatch policy;
when the second timestamp precedes the first timestamp:
select the first resource for dispatching the first thread to;
dispatch the first thread to the first resource; and
create a first power management event when the thread is
dispatched to the first resource, wherein the first
power management event comprises a processing
state transition of the first resource from the first current power state to a target power state for the first
resource;
a power manager, configured to:
receive the first power management event;
determining a third timestamp using utilization data,
wherein the third timestamp is associated with a time
when the first resource last transitioned to the first
current power state; and
determine a time elapsed value for the first resource
using the third timestamp, the time elapsed value
being the difference in time between a present time
and the third timestamp;
obtain a historical latency time value for the first
resource, the historical latency time value being a
time required to transition the hardware resource from
the first current power state to the target power state;
compare the time elapsed value and the historical
latency time value to determine whether transitioning
the first resource to a target power state satisfies a
power management policy; and
transition the first resource to the target power state
when the time elapsed value is greater than the historical latency time value; and
discarding the power management event if the elapsed
time value is less than or equal to the historical latency
time.

7. The system of claim 6, wherein:
the dispatcher, further configured to:
identify the first resource using the first resource utilization entry and the dispatch policy when the first
resource affinity entry is not stored for the first thread.

8. The system of claim 6, wherein:
the resource information store, further configured to:
store a second resource entry for a second resource in the
plurality of resources;
the utilization data store, further configured to:
receive a second current power state for the second
resource from the hardware monitor;
determine a fourth timestamp, wherein the fourth timestamp is associated with when the second resource
transitioned to the second current power state; and
store a second resource utilization entry, wherein the
second resource utilization entry comprises the second current power state and the fourth timestamp;
the dispatcher, further configured to:
obtain the second resource utilization entry from the
utilization data store;
when the first resource affinity entry is not stored for the
first thread:
identify the second resource using the second
resource utilization entry and the dispatch policy;
and
dispatch the first thread to the second resource.

9. The system of claim 6, wherein:
the resource information store, further configured to:
store a second resource entry for a second resource in the
plurality of resources; the utilization data store, further
configured to:
receive a second current power state for the second
resource from the hardware monitor;
determine a fourth timestamp, wherein the fourth timestamp is associated with when the second resource transitioned to the second current power state; and
store a second resource utilization entry, wherein the second resource utilization entry comprises the second current power state and the fourth timestamp;
the dispatcher, further configured to:
obtain the second resource utilization entry from the
utilization data store;
when the first resource is not qualified under the dispatch
policy:
identify the second resource using the second resource
utilization entry and the dispatch policy; and
dispatch the first thread to the second resource.

10. The system of claim 9, wherein:
the resource information store, further configured to:
store a second resource entry for a second resource in the
plurality of resources;
the utilization data store, further configured to:
store a second resource utilization entry, wherein the
second resource utilization entry comprises the second current power state and a fourth timestamp and
wherein the fourth timestamp is associated with when
the second resource transitioned to the second current
power state;
the dispatcher, further configured to:
obtain the second resource utilization entry from the
utilization data store;
when the second timestamp does not precede the first
timestamp:
identify the second resource using the second resource
utilization entry and the dispatch policy; and
dispatch the first thread to the second resource.

11. The system of claim 10, further comprising:
the resource information store, configured to:
store a first power domain entry comprising the first
resource and the second resource; and
the dispatcher, further configured to:
create a second power management event when the first
thread is dispatched to the second resource, wherein
the second power management event comprises a first
power domain identifier (ID) corresponding to the
first power domain, a processing state transition of the
second resource from the second current power state
to the target power state,
the power manager, configured to:
receive the second power management event;
obtain the first resource utilization entry for the first
resource from the utilization data store;
obtain the second resource utilization entry for the second resource from the utilization data store;
determine whether transitioning the second resource to
the target power state satisfies the power management
policy; and transition the second resource to the target power state when the power management policy is satisfied for the second resource.

\* \* \* \* \*